US008744097B2

(12) United States Patent
Nakazawa et al.

(10) Patent No.: US 8,744,097 B2
(45) Date of Patent: Jun. 3, 2014

(54) MICROPHONE DEVICE

(75) Inventors: Yukihiro Nakazawa, Fukuoka (JP); Tetsuo Itou, Kanagawa (JP)

(73) Assignee: Panasonic Corporation, Osaka (JP)

( * ) Notice: Subject to any disclaimer, the term of this patent is extended or adjusted under 35 U.S.C. 154(b) by 406 days.

(21) Appl. No.: 13/146,748

(22) PCT Filed: Jan. 27, 2010

(86) PCT No.: PCT/JP2010/000466

§ 371 (c)(1), (2), (4) Date: Oct. 13, 2011

(87) PCT Pub. No.: WO2010/089975

PCT Pub. Date: Aug. 12, 2010

(65) Prior Publication Data

US 2012/0045077 A1 Feb. 23, 2012

(30) Foreign Application Priority Data

Feb. 6, 2009 (JP) ................................ 2009-025688

(51) Int. Cl.
*H02B 1/00* (2006.01)

(52) U.S. Cl.
USPC .......................................... 381/123; 381/355

(58) Field of Classification Search
CPC .................................... H04R 1/00; H04R 1/02
USPC ..................... 381/123, 355, 375, 91, 92, 122, 381/361–363
See application file for complete search history.

(56) References Cited

U.S. PATENT DOCUMENTS

| | | | | |
|---|---|---|---|---|
| 1,888,204 | A * | 11/1932 | Stimson | 200/60 |
| 4,815,143 | A * | 3/1989 | Derhaag et al. | 381/361 |

FOREIGN PATENT DOCUMENTS

| | | | | |
|---|---|---|---|---|
| CN | 1293527 | | 5/2001 | |
| CN | 2781692 | | 5/2006 | |
| CN | 1826018 | | 8/2006 | |
| EP | 1146772 | | 10/2001 | |
| JP | 55-150567 | | 11/1980 | |
| JP | 60/134254 | | 9/1985 | |
| JP | 60/155138 | | 10/1985 | |
| JP | 61/61731 | | 4/1986 | |
| JP | 08306264 | * | 11/1996 | H01H 21/00 |
| JP | 2000173388 | * | 6/2000 | H01H 21/00 |
| JP | 2002-042603 | | 2/2002 | |

OTHER PUBLICATIONS

English Language Translation of Written Opinion, Sep. 22, 2011.
China Office action, mail date is May 30, 2013.

* cited by examiner

*Primary Examiner* — Davetta W Goins
*Assistant Examiner* — Oyesola C Ojo
(74) *Attorney, Agent, or Firm* — Greenblum & Bernstein, P.L.C.

(57) ABSTRACT

A microphone has a slide member and a push member. The slide member has a slide knob, and a conductive state and a nonconductive state are switched according to operation of the slide knob. The push member holds a switch in the conductive state while a push button is pushed. A mechanism interlocking of the slide member and the push member is provided and interlocks operation of the slide member with the push member by converting movement of the slide member in a sliding direction into movement of the push member in a pushing direction, the slide knob and the push button are separated from each other in the sliding direction.

20 Claims, 16 Drawing Sheets

(Nonconductive state)

(Push operation)

(Slide operation)

(Switch protecting mechanism)

(Switch protecting mechanism)

(Interlocking mechanism)

(Interlocking mechanism)

(Incorrect operation preventing cover)

Use of knob

Use of button

MICROPHONE DEVICE

TECHNICAL FIELD

The present invention relates to a microphone device in which a switch structure has been improved.

BACKGROUND ART

Conventionally, a handheld type microphone device (hereinafter, the microphone device is simply referred to also as a microphone) has been used for various applications. The conventional common microphone has a slide switch operated for power-on and power-off. The slide switch is provided on a cylindrical surface of a microphone body, and it is slid between a conductive position and a nonconductive position.

In places of education, for example, students may sometimes speak in turns using a microphone. In such a case, power-on and power-off of the microphone are repeated in a short time. However, a microphone with a structure including a conventional slide switch has been inconvenient since independent operation is required for power-on and power-off of the microphone.

In addition, when a microphone is handed over while the microphone is powered on, touch noise is picked up by the microphone and is output from a speaker. In addition, when the microphone is dropped at the time of being handed over, an impact sound is input into the microphone and is output from the speaker.

Patent Literature 1 has proposed a microphone capable of dealing with the above-described problem. A rotary member is provided in a microphone case in Patent Literature 1. The rotary member has a projecting part projecting from a window of the microphone case. A movable piece is provided outside the projecting part. In addition, one end of a pressing piece is provided inside the projecting part, and it is coupled with the movable piece with the projecting part interposed therebetween. An other end of the pressing piece is engaged with a switch lever. The switch lever comes into contact with a pin plunger of a power switch.

In the above-described configuration, the movable piece is slid between an upper position and a lower position. When the movable piece is slid to the upper position, the pressing piece presses the switch lever, and thereby the microphone becomes in a conductive state. When the movable piece is in the lower position, the rotary member rotates, the pressing piece presses the switch lever, and the microphone becomes in the conductive state only while the movable piece is pressed.

According to the above-described conventional technique, when using the microphone for a long time, the conductive state is maintained by sliding the movable piece. In addition, when using the microphone for a short time, the microphone is in the conductive state only while the movable piece is pushed down. Hence, the microphone can be easily operated when using it for a short time.

However, both slide operation and push-down operation are performed to one movable piece in the conventional microphone device. Therefore, a user may unintentionally slide the movable piece while the user holds the movable piece down. For example, when an operator obliquely upwardly pushes the movable piece, the movable piece slides easily while the movable piece is held down. Additionally, when such incorrect operation is performed, the movable piece slides in the conductive state, a rubbing sound of the movable piece with the microphone case is picked up by the microphone as noise, and is output from the speaker. In addition, there is a possibility that the above-described incorrect operation is performed unconsciously. In that case, the microphone is handed over without noticing its conductive state, and touch noise is output. In addition, when the microphone is placed on a desk etc., larger noise is output.

In addition, although it is conceivable to provide a plurality of switches in order to prevent the above-described incorrect operation, a configuration of the microphone becomes complicated.

Here, a background of the present invention has been described by taking up a slide knob and a push button. However, a similar problem may occur in cases other than a combination of these operating members.

CITATION LIST

Patent Literature

Patent Literature 1
Japanese Utility Model Laid-Open No. S55-150567

SUMMARY OF INVENTION

Technical Problem

The present invention is made under the above-described background. An object of the present invention is to provide a microphone device that is highly convenient when used for a short time, is capable of avoiding noise output when handed over and dropped, is further capable of preventing noise due to incorrect operation, and has a simple configuration.

Solution to Problem

A first aspect of the present invention is a microphone device, and this microphone device includes: an electrical contact component that switches a conductive state and a nonconductive state of a microphone power supply; a first operating part having a first operating portion on which power-on operation in a first operating direction and power-off operation in an opposite direction to the first operating direction are independently performed by a microphone user; a second operating part that has a second operating portion on which power-on operation in a second operating direction different from the first operating direction is performed, and that holds the electrical contact component in the conductive state while power-on operation is performed in the second operating direction; and an interlocking part that interlocks the operation of the first operating part with the second operating part by converting movement of the first operating part in the first operating direction into movement of the second operating part in the second operating direction, and by converting movement in the opposite direction to the first operating direction of the first operating part into movement in an opposite direction to the second operating direction of the second operating part, wherein the first operating portion of the first operating part and the second operating portion of the second operating part are separated from each other.

As described hereinafter, there are other aspects in the present invention. Hence, disclosure of the present invention is intended to provide a part of the aspects of the present invention, and it is not intended to limit the scope of the invention described and claimed herein.

DESCRIPTION OF EMBODIMENT

Figure 1:
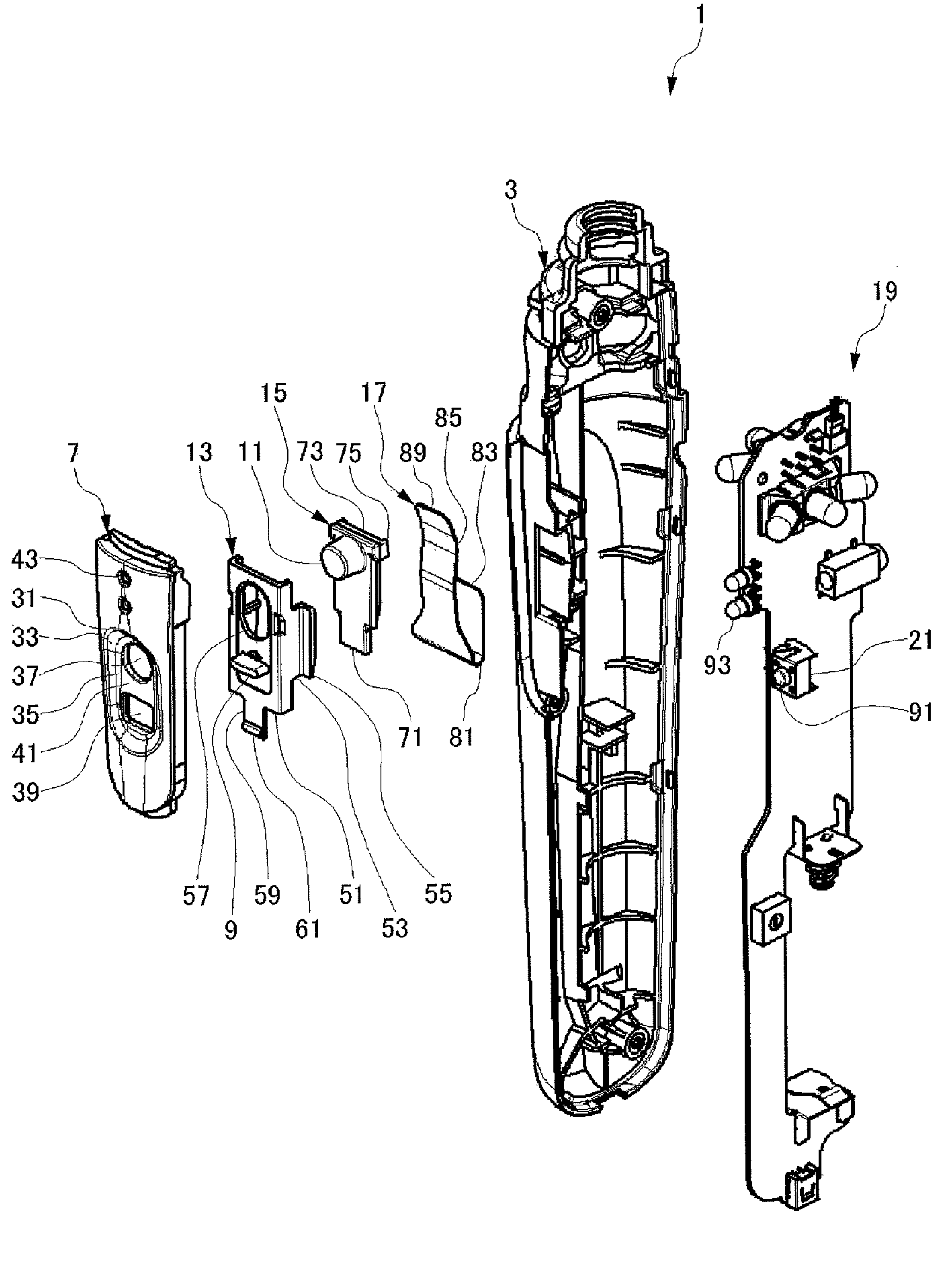
FIG. 1 is an exploded perspective view of a microphone device in an embodiment of the present invention.

A detail of the present invention will be described hereinafter. However, the following detailed description and appended drawings do not limit the invention. Instead, the scope of the invention is defined by the appended claims.

A microphone device of the present invention includes: an electrical contact component that switches a conductive state and a nonconductive state of a microphone power supply; a first operating part having a first operating portion on which power-on operation in a first operating direction and power-off operation in an opposite direction to the first operating direction are independently performed by a microphone user; a second operating part that has a second operating portion on which power-on operation in a second operating direction different from the first operating direction is performed, and that holds the electrical contact component in the conductive state while the power-on operation is performed in the second operating direction; and an interlocking part that interlocks the operation of the first operating part with the second operating part by converting movement of the first operating part in the first operating direction into movement of the second operating part in the second operating direction, and by converting movement in the opposite direction to the first operating direction of the first operating part into movement in an opposite direction to the second operating direction of the second operating part, wherein the first operating portion of the first operating part and the second operating portion of the second operating part are separated from each other.

According to this configuration, two operating parts and the interlocking part are provided at the microphone device. The first operating part has a configuration on which power-on operation and power-off operation are performed independently, and the conductive state and the nonconductive state are switched according to the operation on the first operating portion. The second operating part holds the electrical contact component in the conductive state while power-on operation is performed, and it turns the power off when a force of the power-on operation is removed. While the first operating part is conveniently used when using the microphone device for a long time, the second operating part is conveniently used when repeating power-on and power-off for a short time. In addition, by using the second operating part, the microphone power supply is turned off when the microphone device is handed over or dropped, and thus noise output can be avoided. In addition, since the operation on the first operating part is transmitted to the electrical contact component through the second operating part by having provided the interlocking part, only one electrical contact component may be needed, and thus the configuration of the microphone device is simple. Further, since the first operating portion and the second operating portion are separated from each other, it is possible to prevent incorrect operation such as that occurring when the first operating part is operated incorrectly during the operation of the second operating part. In this way, the microphone device can be provided that is highly convenient when used for a short time, is capable of avoiding noise output when handed over and dropped, is further capable of preventing noise due to incorrect operation, and has a simple configuration.

In addition, in the microphone device of the present invention, the first operating part includes a slide member having a slide knob as the first operating portion that can slide between a conductive position and a nonconductive position, the first operating direction is a sliding direction of the slide knob, the second operating part includes a push member having a push button as the second operating portion, the second operating direction is a pushing direction of the push button, and the push button may be separated from the slide knob.

According to this configuration, the slide member is provided as the first operating part, and the push member is provided as the second operating part. The slide knob is highly convenient when the microphone device is used for a long time, and the push button is highly convenient when the microphone device is used for a short time. Additionally, as mentioned above, the microphone device can be provided that is highly convenient when used for a short time, is capable of avoiding noise output when handed over and dropped, is further capable of preventing noise due to incorrect operation, and has a simple configuration.

In addition, in the microphone device of the present invention, the interlocking part has a first inclined surface provided on the slide member, and a second inclined surface provided on the push member, the first inclined surface and the second inclined surface are inclined relative to the sliding direction and the pushing direction, and when the slide member is slid from the nonconductive position to the conductive position, the first inclined surface may press the second inclined surface to thereby move the push member in the pushing direction.

According to this configuration, when the slide member is slid, the inclined surfaces of the slide member and the push member engage with each other, and thereby the push member interlocks with the slide member. A simple configuration comprised of the two inclined surfaces to be engaged with each other enables the push member to interlock with the slide member.

In addition, the microphone device of the present invention has a spring member arranged between the electrical contact component and the push member, and the spring member may bias the push member in an opposite direction to the pushing direction.

According to this configuration, push operation is transmitted to the electrical contact component through the spring member. In addition, when the push button is not pushed, the push member is biased by the spring member, and thereby the nonconductive state is maintained. In this way, according to a simple configuration in which the spring member is interposed between the electrical contact component and the push member, a function of the push member to temporarily turn the power on can be suitably achieved.

In addition, in the microphone device of the present invention, the push button may be arranged closer to a tip side of the microphone than the slide knob.

According to this configuration, incorrect operation can be suitably prevented as follows. When a user operates the push button while gripping the microphone, his thumb is directed to a tip of the microphone in many cases. Therefore, when the user pushes down the push button with his thumb, the thumb tends to slip toward the tip side of the microphone. Since the push button is arranged closer to the tip side of the microphone than the slide knob in this configuration, the thumb does not come into contact with the slide knob even if the thumb slips. Hence, incorrect operation can be prevented more reliably.

In addition, the microphone device of the present invention may have a locking part that locks the slide member in either the conductive position or the nonconductive position.

According to this configuration, the slide member can be reliably held at the conductive position or the nonconductive position, and thus the conductive state or the nonconductive state can be reliably maintained.

In addition, in the microphone device of the present invention, the locking part has an elastic claw that is provided at the slide member and that projects from an elastically deflectable elastic piece part, and the elastic claw may fit in any of a plurality of claw fitting parts respectively corresponding to the conductive position and the nonconductive position to thereby limit movement of the slide member.

According to this configuration, with a simple configuration in which the elastic claw is provided at the slide member, the slide member can be locked in the conductive position or the nonconductive position.

In addition, the microphone device of the present invention may have a butting structure in which movement of the push member in the pushing direction is restrained before a load on the push button exceeds a predetermined upper-limit load.

According to this configuration, even when the push button is pushed in with an unusual overload by mischief etc., a protective function can be provided that prevents the electrical contact component from being damaged. In addition, such protective function can be achieved without increasing the number of parts.

In addition, the microphone device of the present invention has an operation panel that covers the push member and the slide member, the operation panel has a button opening for exposing the push button, and a knob opening for exposing the slide knob, and the button opening and the knob opening may be partitioned by a partitioning part.

According to this configuration, the push button and the slide knob can be appropriately separated from each other, and thus incorrect operation can be prevented reliably.

In addition, in the microphone device of the present invention, the operation panel has a recess surrounded by the inclined surface, and the button opening and the knob opening may be provided at a bottom of the recess.

According to this configuration, the push button and the slide knob are arranged at the recess of the operation panel. The recess of the operation panel is surrounded by the inclined surface. As a result, the user's finger is guided by the inclined surface, incorrect operation can be reduced, and operation of the microphone becomes easy. Preferably, the push button is arranged closer to the tip side of the microphone than the slide knob, and near the inclined surface. As a result, even though the user's thumb is about to slip from the push button, it is supported by the inclined surface of the operation panel. Hence, slip of the user's thumb can be prevented, and operation of the microphone becomes easy.

In addition, the microphone device of the present invention may include an incorrect operation preventing cover that is removable with respect to the operation panel, and that selectively covers either the push button or the slide knob.

According to this configuration, either the push button or the slide knob is covered by the incorrect operation preventing cover. As a result, assuming that the user operates either the push button or the slide knob in the long run, touching the other adjacent operating portion incorrectly can be prevented.

As described above, in the present invention, the second operating part is provided in addition to the first operating part, the first operating part and the second operating part are interlocked with each other, and further, the first operating portion and the second operating portion are separated from each other, and having provided such configuration allows for providing the microphone device that is highly convenient when used for a short time, is capable of avoiding noise output when handed over and dropped, is further capable of preventing noise due to incorrect operation, and has a simple configuration.

Hereinafter will be described a microphone device of an embodiment of the present invention using drawings.

Figure 2:
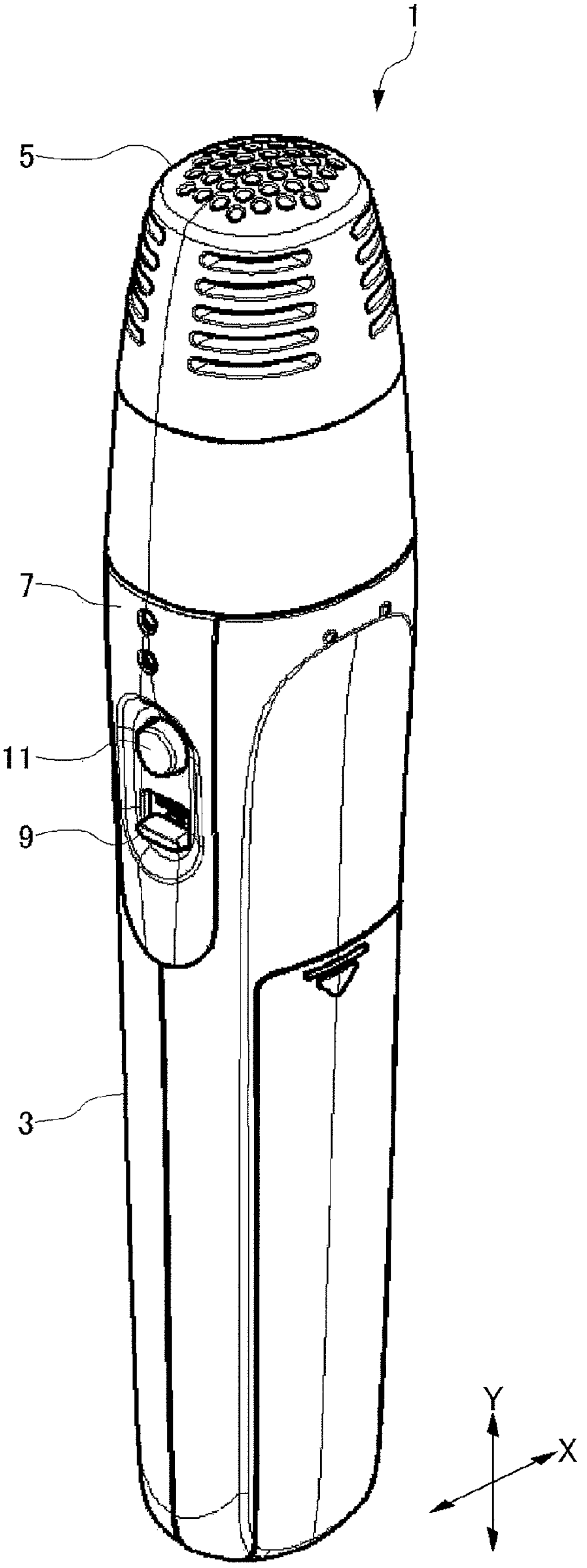
FIG. 2 is an external perspective view of the microphone device in the embodiment of the present invention.
Figure 3:
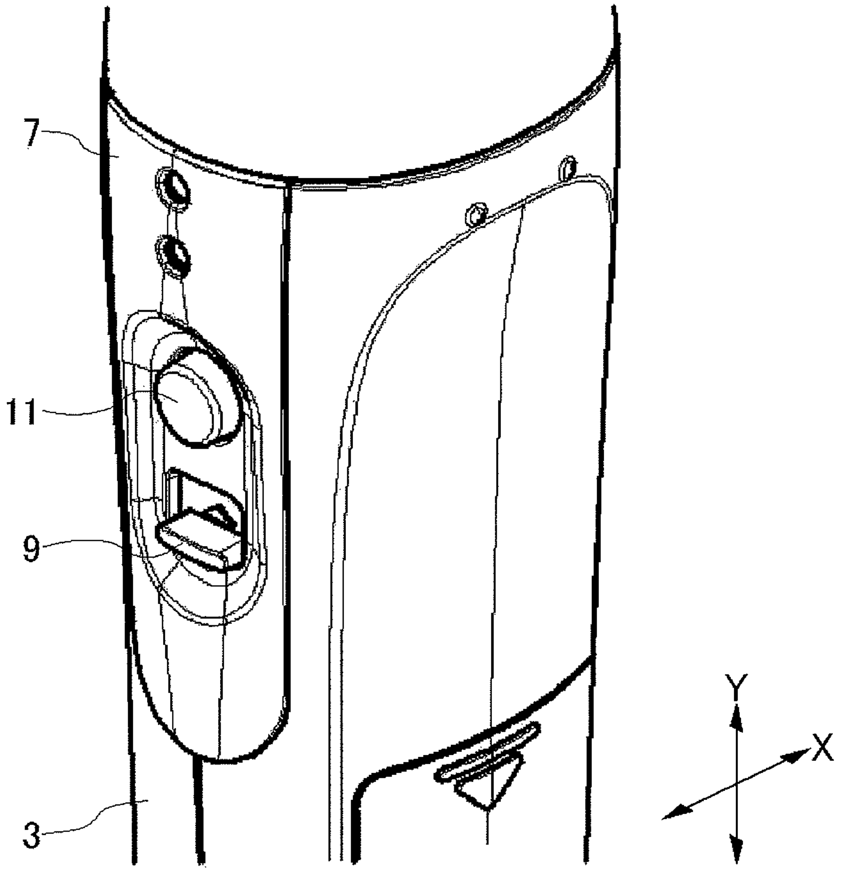
FIG. 3 is an enlarged perspective view of an operation panel part of the microphone device.
Figure 4:
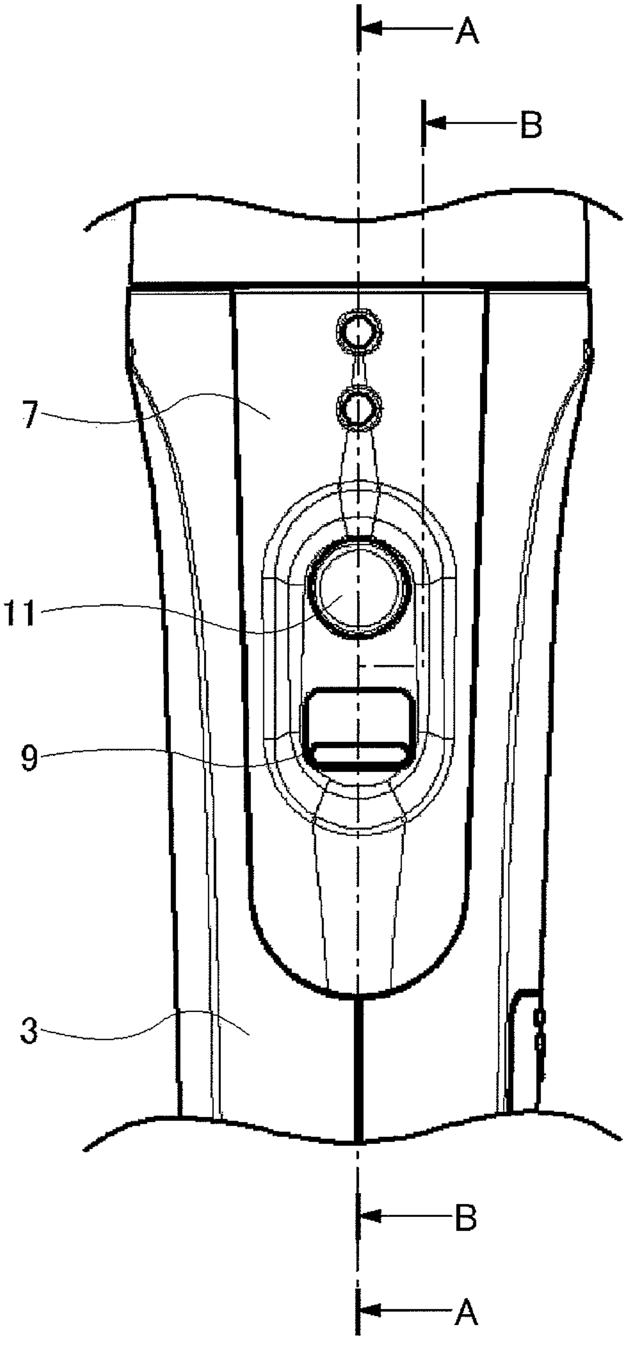
FIG. 4 is an elevational view of the operation panel part of the microphone device.
Figure 5:
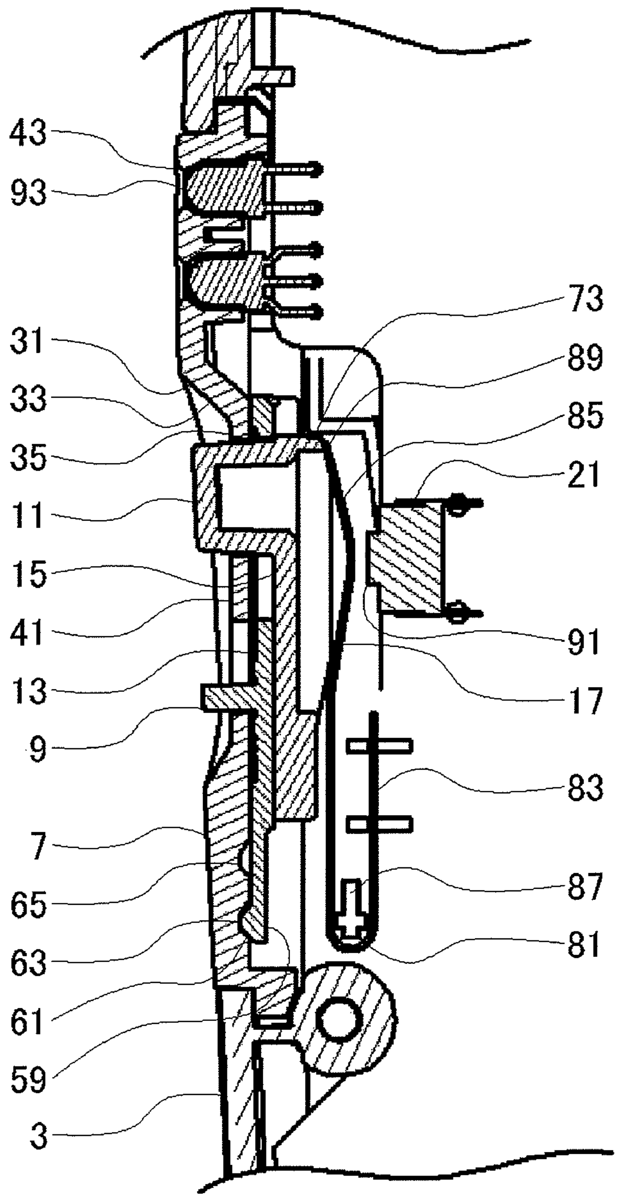
FIG. 5 is a cross-sectional view of the microphone device.
Figure 6:
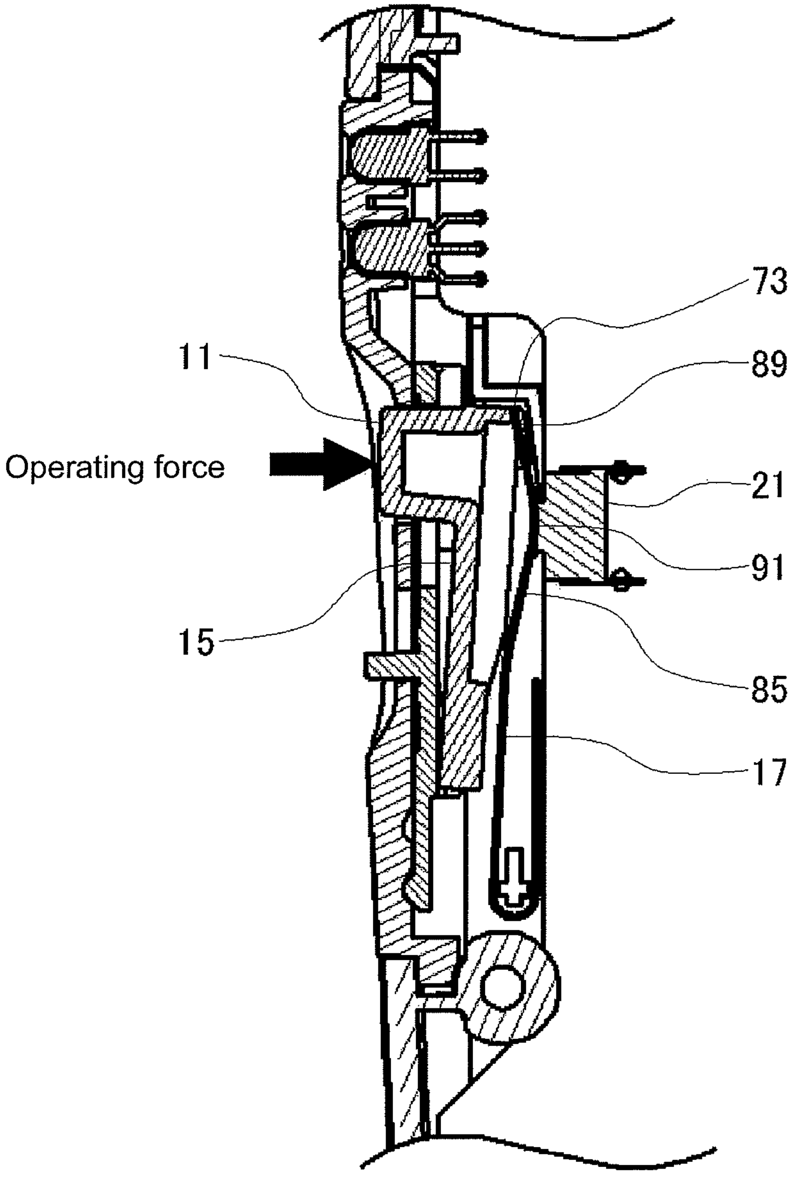
FIG. 6 is a cross-sectional view showing push operation.
Figure 7:
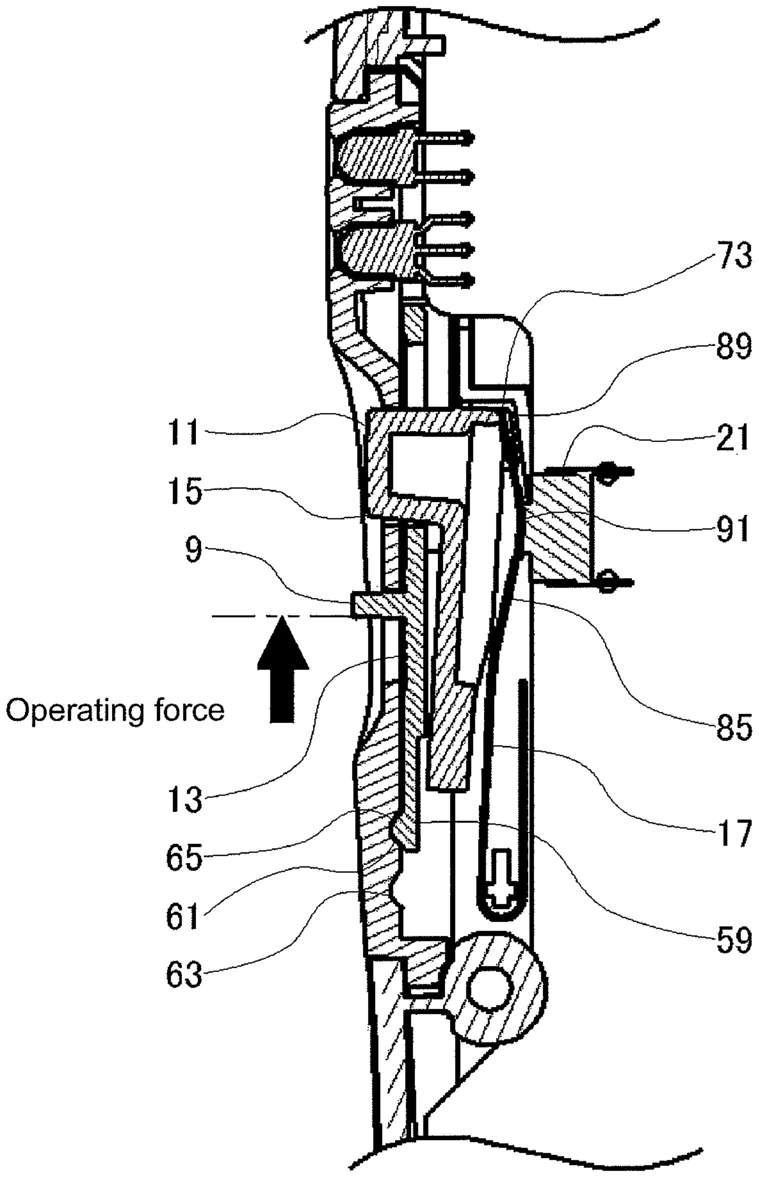
FIG. 7 is a cross-sectional view showing slide operation.

The microphone device (hereinafter simply referred to as a microphone) of the embodiment of the present invention will be shown in FIGS. 1 to 7. FIG. 1 is an exploded perspective view of a microphone 1, FIG. 2 is an external perspective view of the microphone 1, FIG. 3 is an enlarged perspective view of an operation panel part of the microphone 1, FIG. 4 is an elevational view of the operation panel part, FIG. 5 is a cross-sectional view of the microphone 1 in a nonconductive state (power-off state) taken along a line A-A of FIG. 4, and further, FIG. 6 is a cross-sectional view corresponding to FIG. 5, and shows a state in push operation. Although FIG. 7 is also a cross-sectional view corresponding to FIG. 5, FIG. 7 shows slide operation.

First, referring to external views of FIGS. 2 and 3, the microphone 1 is a cylindrical shape as a whole, and a sound collecting part 5 is provided at a tip of a body case 3. An operation panel 7 is provided on an outer surface of the body case 3, and it constitutes a microphone body together with the body case 3. Additionally, a slide knob 9 and a push button 11 are arranged on the operation panel 7. The slide knob 9 can be slid along the outer surface, and the push button 11 can be pushed down perpendicular to the outer surface.

Hereinafter, a sound collecting part side of the microphone 1 is referred to as a "tip" or a "top", and an opposite side thereof is referred to as a "base end" or a "bottom." In addition, an outer surface side of the cylindrical shape is referred to as an "outside", and a center side of the cylindrical shape is referred to as an "inside." Further, a direction perpendicular to the operation panel 7 is referred to as an X direction, and a vertical direction of the operation panel 7 is referred to as a Y direction. The X direction is a pushing direction of the push button 11, and the Y direction is a sliding direction of the slide knob 9.

Next, a configuration of the microphone 1 will be described in more detail with reference to FIG. 1 etc. As shown in FIG. 1, the microphone 1 has the body case 3, and the operation panel 7, a slide member 13, a push member 15, a spring 17, and a printed circuit board 19 are attached to the body case 3.

The slide knob 9 is provided at the slide member 13, and the push button 11 is provided at the push member 15. Further, the printed circuit board 19 is provided with a switch 21.

The body case 3 has a division structure, and two half parts are combined together to form the cylindrical shape. The operation panel (switch panel) 7 is attached to the body case 3 so as to be exposed from a cylindrical surface of the body case 3. The operation panel 7 is caught between the two half parts of the body case 3, and thereby completely restrained by the body case 3.

A recess 31 is provided on the outer surface of the operation panel 7, and the recess 31 is surrounded by an inclined surface 33. A button opening 37 and a knob opening 39 are provided on a bottom 35 of the recess 31. The button opening 37 is circular, the knob opening 39 is quadrangular, and the button opening 37 is located closer to a tip side than the knob opening 39. The button opening 37 and the knob opening 39 are partitioned by a partitioning part 41. In addition, the operation panel 7 has two openings 43 for indicator lamps, the openings being located closer to the tip side than the recess 31.

The slide member 13 is arranged inside the operation panel 7. The slide member 13 is restrained immovably in the X direction by the body case 3 and the operation panel 7, and it is movable in the Y direction in a range of 4 millimeters. An upper end of a slide stroke is referred to as a conductive position (power-on position), and a lower end thereof is referred to as a nonconductive position (power-off position). The slide member 13 is located at the nonconductive position in FIG. 5. The slide member 13 is located at the conductive position in FIG. 7.

The slide member 13 has a slide plate 51, legs 53 extend inside from both right and left ends of the slide plate 51, and tips of the legs 53 project from both sides to form guide convex parts 55. The guide convex parts 55 have fitted in a guide rail provided at the body case 3, and thereby the slide member 13 can be slid in the Y direction.

The slide knob 9 projects toward an outside from the slide plate 51. The slide knob 9 is a thin plate, and projects from the knob opening 39 of the operation panel 7. The knob opening 39 is a quadrangular shape according to a stroke of the slide knob 9 so as not to interfere with the operation panel 7 even though the slide knob 9 is slid.

In addition, the slide plate 51 has an opening 57 for the button at an upper part of the slide knob 9. The push button 11 has penetrated the opening 57. The opening 57 is an oval shape with a length according to the stroke of the slide knob 9 so as not to interfere with the push button 11 even though the slide member 13 slides.

In addition, an elastic piece part 59 projects from a lower end of the slide plate 51, and an elastic claw 61 is provided at a tip of the elastic piece part 59 so as to be directed outside. The elastic claw 61 fits in either of two claw fitting parts 63 and 65 (FIG. 5) provided on a back surface of the operation panel 7.

The respective claw fitting parts 63 and 65 are grooves with a shape to engage with the elastic claw 61. The lower claw fitting part 63 corresponds to the nonconductive position of the slide knob 9, and the upper claw fitting part 65 corresponds to the conductive position of the slide knob 9. As shown in FIG. 5, when the slide member 13 is located at the lower nonconductive position, the elastic claw 61 engages with the lower claw fitting part 63. As shown in FIG. 7, when the slide member 13 is located at the upper conductive position, the elastic claw 61 engages with the upper claw fitting part 65.

Since the elastic claw 61 fits in the claw fitting part 63 or 65 as described above, the slide knob 9 is locked in the conductive position or the nonconductive position, and unless a predetermined slide operation force is applied to the slide knob 9, the slide member 13 does not slide. When the predetermined slide operating force is applied to the slide knob 9, the elastic piece part 59 bends, the elastic claw 61 comes away from the claw fitting part 63 or 65, and the slide member 13 slides. As described above, the elastic claw 61 constitutes locking means of the present invention.

Next, the push member 15 will be described. The push member 15 is arranged inside the slide member 13. Although the push member 15 is restrained immovably in the Y direction by the body case 3 and the operation panel 7, it is movable in the X direction in a range of 2 millimeters.

The push member 15 has a plate-shaped button base 71, the button base 71 is in contact with an inside of the slide plate 51 of the slide member 13, and it is located between the legs 53 of the both sides of the slide plate 51. The circular push button 11 projects outside from the button base 71. The push button 11 passes through the opening 57 of the slide member 13, and further, it passes through the button opening 37 of the operation panel 7 to project outside the microphone body.

Here, the button opening 37 and the knob opening 39 of the operation panel 7 are partitioned to be separated by the partitioning part 41 as mentioned above, and the button opening 37 is located closer to the tip side of the microphone than the knob opening 39. Hence, although the push member 15 and the slide member 13 are overlappingly arranged, the slide knob 9 (the first operating portion of the present invention) and the push button 11 (the second operating portion of the present invention) are located at upper and lower sides away from each other to be completely separated from each other, and the push button 11 is located closer to the tip side of the microphone than the slide knob 9.

The push member 15 is in contact with a tip 89 of the spring 17 at a contact part 73 of the tip, and it is biased outside, i.e., toward an opposite direction to the pushing direction (X direction) by the spring 17. Hence, since tension of the spring 17 is applied, the push button 11 is not pushed down unless a predetermined push operating force is applied. When the above-described push operating force is applied, the push button 11 is pushed down in the pushing direction.

Figure 8:
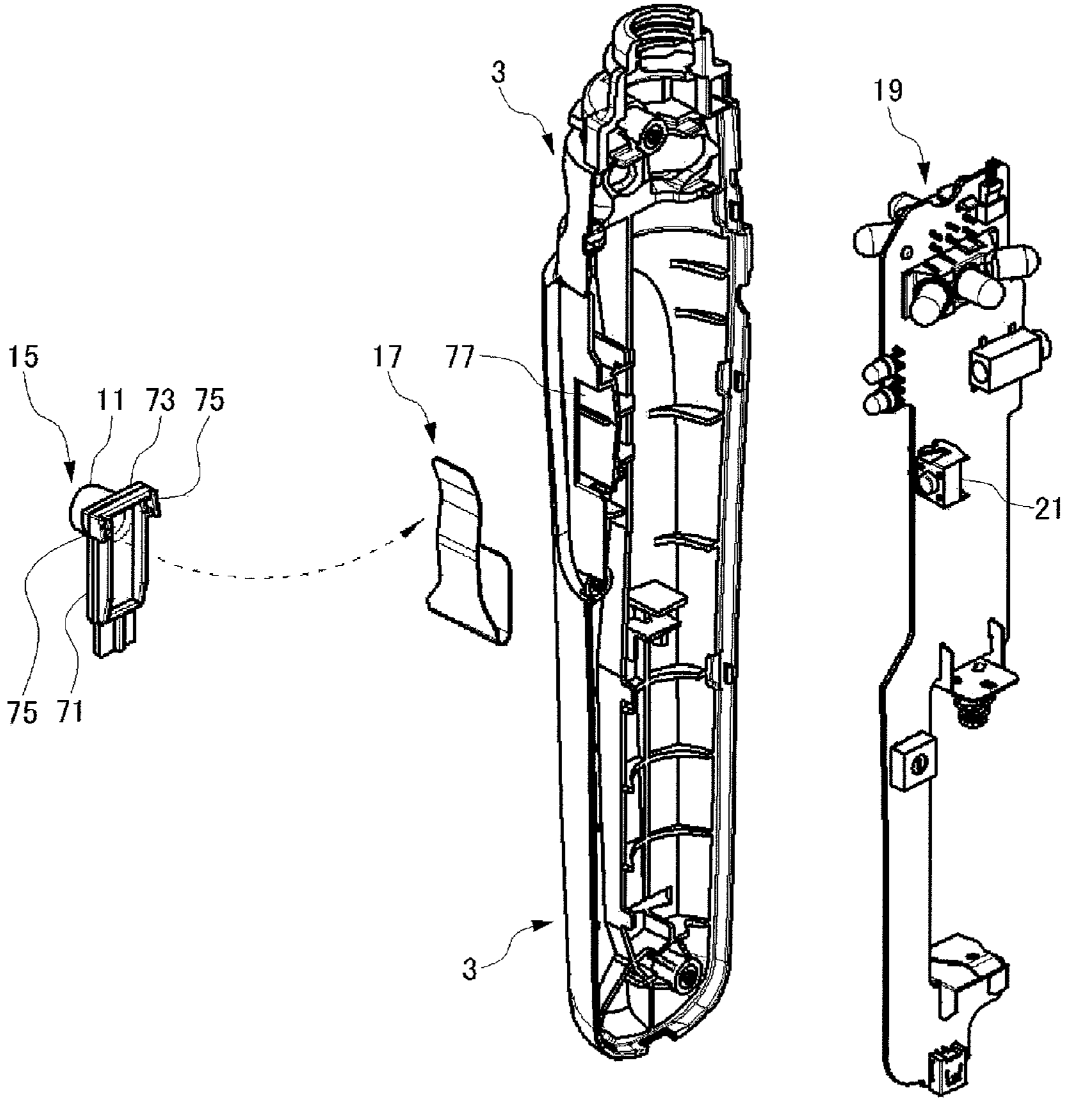
FIG. 8 is a view showing a butting mechanism of a push member.

In addition, the butting structure for protecting the switch will be described with reference to FIGS. 8 and 9. As shown in FIG. 8, the push member 15 has two projecting parts 75 at the tip thereof. These projecting parts 75 are provided at both right and left ends of the tip of the push member 15, and project inside. The projecting parts 75 constitute the butting structure of the present invention, and when a push-down amount of the push button 11 reaches a predetermined maximum push stroke, the projecting parts 75 come into contact with a butting wall 77 (FIG. 9), which is a butting part provided on a partition wall of the body case 3, and the push button 11 cannot be pushed down any more. This butting structure is set so that movement of the push member 15 may be restrained before a load on the push button 11 exceeds a predetermined upper-limit load, and thereby a protective function for the switch 21 is provided. The upper-limit load is, for example, 15 kg.

The maximum stroke of the push button 11 is decided depending on the above-described butting position. When the push button 11 is not pushed down, the push member 15 is biased by the spring 17 to butt against the slide member 13. A distance between these butting positions is the push stroke, and it is set to be approximately 2 millimeters as mentioned above.

Next, the spring 17 will be described. The spring 17 biases the push member 15 toward the outside as already described. The spring 17 is a flat spring, it is a folded shape, one side of a folding part 81 is a fixing part 83, and an other side thereof is a movable part 85. The folding part 81 is arranged at a lower side, the fixing part 83 and the movable part 85 extend upwardly, the fixing part 83 is arranged inside, and the movable part 85 is arranged outside.

The fixing part 83 is attached to the body case 3, and restrained completely. The folding part 81 has engaged with a support point 87 (FIG. 5) of the body case 3. The movable part 85 is a cantilever fixed to the support point 87, and it is deflectable in the X direction (pushing direction of the push button 11).

The movable part 85 extends upwardly from the support point 87 as shown, and then, it bends upwardly and inwardly to extend toward the switch 21. A gap is provided between the movable part 85 and the switch 21. The movable part 85 bends again near the switch 21 to extend upwardly and outwardly, and the tip 89 of the movable part 85 comes into contact with the contact part 73 of a top end of the push member 15 to thereby bias the contact part 73 toward the outside.

The movable part 85 is the above-described shape, and thereby the spring 17 biases the push button 11 toward the outside. Additionally, this biasing force causes the push member 15 to come into contact with the slide member 13 when the push button 11 is not pushed. When the push button 11 is pushed, the movable part 85 bends, comes into contact with the switch 21, and thereby pushes the switch 21. As described above, push operation for the push button 11 is transmitted to the switch 21 through the spring 17.

Next, the printed circuit board 19 and the switch 21 will be described. The printed circuit board 19 is housed in the body case 3. The switch 21 is attached to the printed circuit board 19, and it is completely restrained by the body case 3 through the printed circuit board 19.

The switch 21 is a push-type switch, and it has a stem 91 as a portion to be pushed down. When the stem 91 is pushed, an internal contact circuit is closed, and power supply of the microphone 1 is turned on. When the stem 91 is released from a pushed-down state, a contact is opened, and the power supply of the microphone 1 is turned off. In this way, the conductive state (power-on state) and the nonconductive state (power-off state) of the microphone 1 (switch 21) are switched.

Two indicator lamps 93 are further attached to the printed circuit board 19. The respective indicator lamps 93 are LEDs. The indicator lamps 93 are located above the switch 21, and they have been exposed from the openings 43 of the operation panel 7.

Next, referring to FIGS. 10 and 11, an interlocking mechanism of the slide member 13 and the push member 15 will be described. This interlocking mechanism is provided in order to interlock the push member 15 with movement of the slide member 13 when the slide knob 9 is operated.

Figure 10:
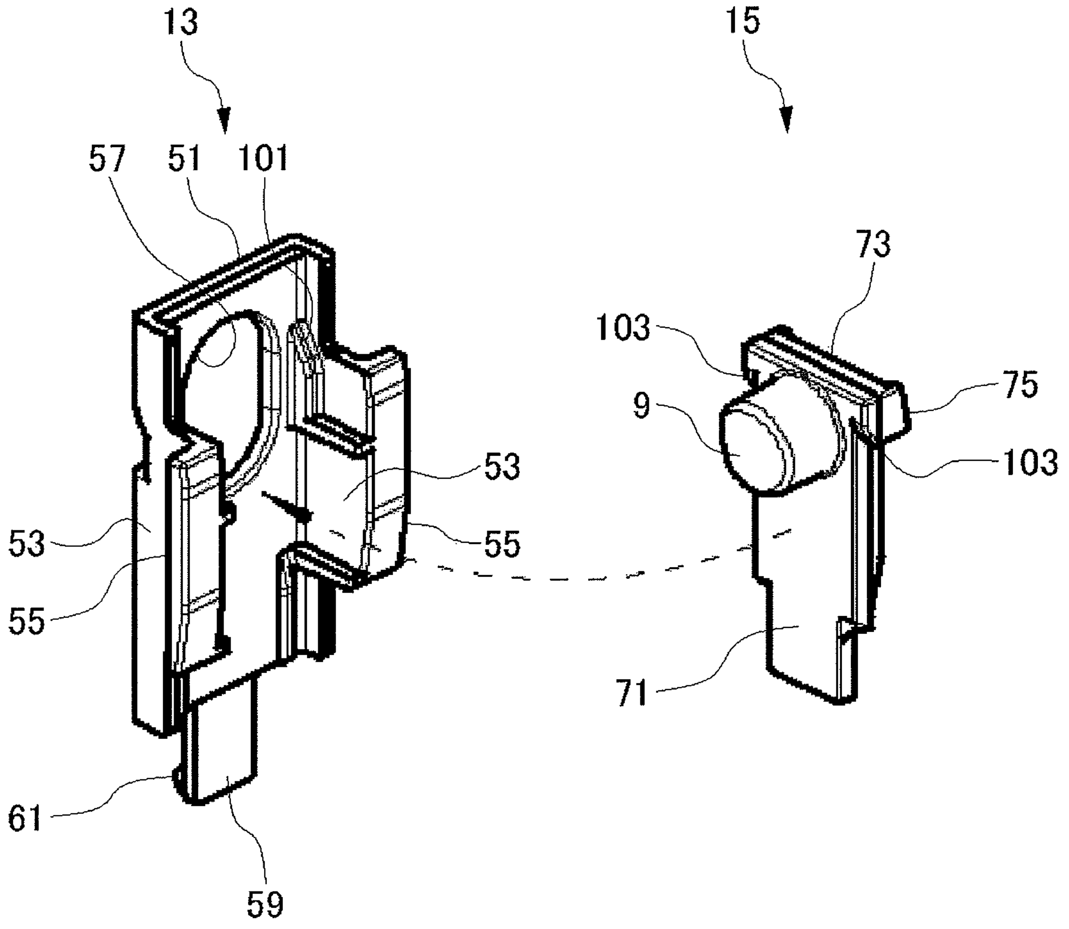
FIG. 10 is a view showing an interlocking mechanism of a slide member and the push member.
Figure 11:
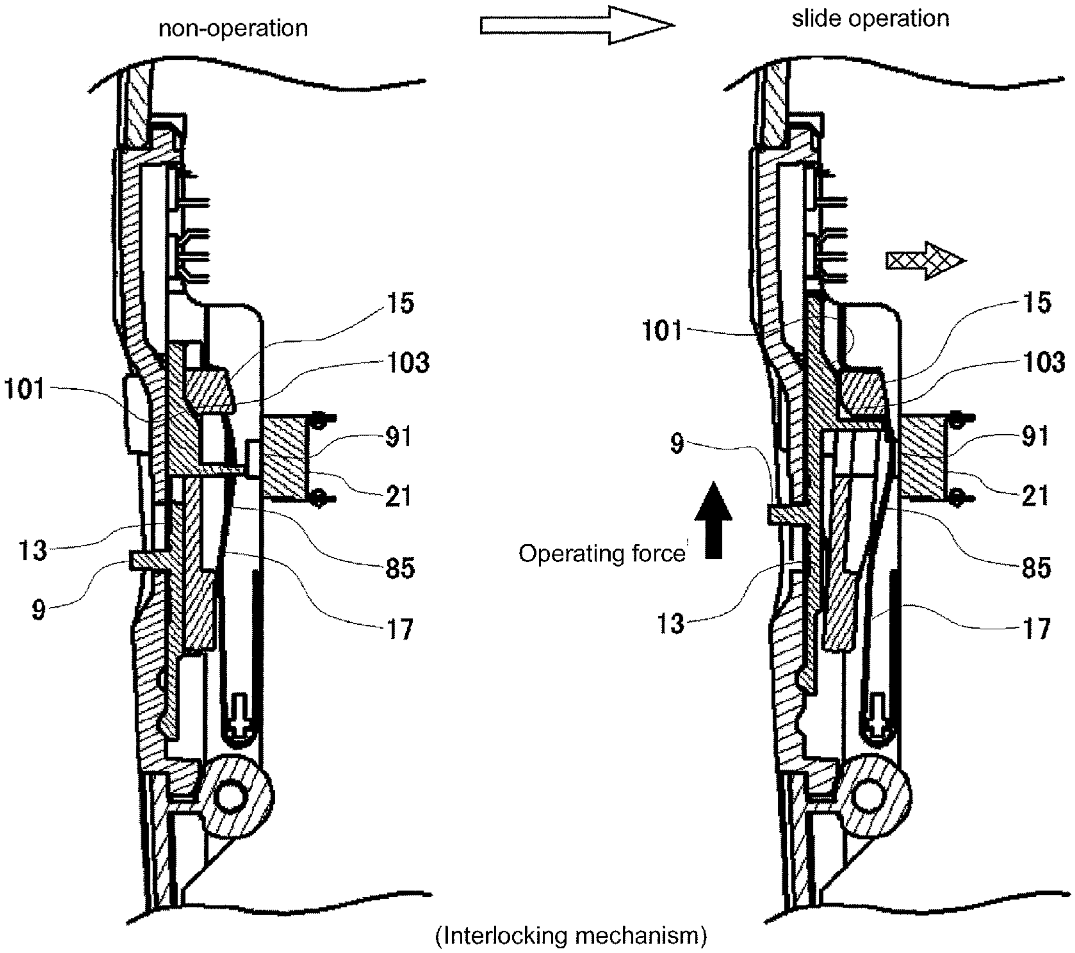
FIG. 11 is a cross-sectional view of the operation panel part of the microphone device.

FIG. 10 shows a back surface of the slide member 13 and an outer surface of the push member 15, FIG. 11 is a cross-sectional view of the microphone 1 taken along a line B-B of FIG. 4, and the line B-B passes through the interlocking mechanism. A behavior of the interlocking mechanism is shown in FIG. 11.

As shown in FIG. 10, the interlocking mechanism is comprised of first inclined surfaces 101 of the slide member 13, and second inclined surfaces 103 of the push member 15. The first inclined surfaces 101 are provided on a back surface of the slide plate 51 of the slide member 13. More specifically, the first inclined surfaces 101 are provided on inner wall surfaces of the legs 53 while being adjacent to each of the right and left legs 53. In addition, the second inclined surfaces 103 are provided at both right and left ends of the button base 71 of the push member 15.

As shown in FIG. 11, the first inclined surfaces 101 and the second inclined surfaces 103 are inclined at the same angle, and these first inclined surfaces 101 and the second inclined surfaces 103 are inclined relative to both the X direction (pushing direction) and the Y direction (sliding direction).

When the slide member 13 is located at the lower nonconductive position, the first inclined surfaces 101 and the second inclined surfaces 103 are adjacent to each other with a small gap therebetween. When the slide member 13 is slid upwardly for turning the power on, the first inclined surfaces 101 come into contact with the second inclined surfaces 103, and then engage therewith. The first inclined surfaces 101 push the second inclined surfaces 103, and thereby movement of the slide member 13 in the sliding direction is converted into movement of the push member 15 in the pushing direction. In this way, the push member 15 interlocks with the slide member 13 to move in the pushing direction, and it closes the switch 21 through the spring 17. When the slide member 13 is slid downwardly, the first inclined surfaces 101 are also slid to move away from the second inclined surfaces 103, and then the switch 21 is opened.

The configuration of the microphone 1 has been described above. In the above-described embodiment, the slide member 13 and the push member 15 correspond to first operating means and second operating means of the present invention. However, the first operating means and the second operating means need not be limited to the above-described configuration within the scope of the present invention.

Next, a behavior of the microphone 1 according to the embodiment will be described. Here, two operation methods of the microphone 1 will be described. The two operation methods are a push operation method and a slide operation method.

Figure 12:
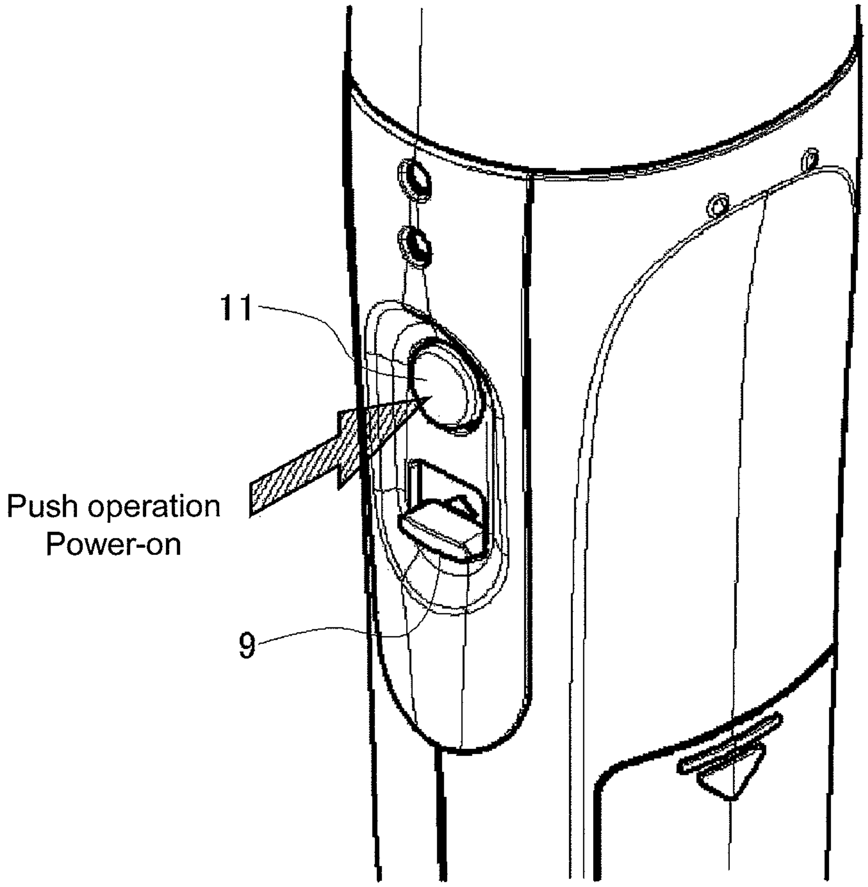
FIG. 12 is a perspective view showing a push operation method.

First, referring to FIGS. 5, 6, and 12, push operation will be described. FIG. 12 shows the push operation method, FIG. 5 shows a state before the operation, and FIG. 6 shows a state where the push operation is in effect. In the push operation, a user grasps the microphone 1, and pushes down the push button 11 with his thumb in the X direction as power-on operation. When the push button 11 is pushed down, the push member 15 pushes down the switch 21 through the spring 17. Particularly, the push member 15 overcomes the biasing force of the spring 17 to move in the X direction, bends the movable part 85 of the spring 17, and the movable part 85 comes into contact with the stem 91 of the switch 21 to then push down the switch 21. As a result, the switch 21 is closed, and then the microphone 1 becomes in the conductive state.

When completing the push operation, the user's thumb is moved away from the push button 11, and thereby the push operating force is removed. A shape of the spring 17 restores, the push member 15 is biased in an opposite direction to the pushing direction, and the push button 11 returns to an original position. The movable part 85 of the spring 17 moves away from the switch 21, the contact of the switch 21 is opened, and the microphone 1 becomes in the nonconductive state.

As described above, in the push operation, the microphone 1 is in the conductive state only while the push button 11 is pushed, i.e., only during power-on operation. When a pushing-down force for the push button 11 is removed, power supply is turned off, and the microphone 1 becomes in the nonconductive state. Such push operation is convenient when a microphone is used for a short time. In addition, even when the microphone 1 is handed over or the microphone 1 is dropped, power supply is turned off at the moment when a hand is moved away from the push button 11. Hence, touch noise and an impact sound can be avoided from being output.

In addition, assume that the push button 11 is pushed in with the unusual overload by mischief etc. in the push operation. Even in such a case, the switch 21 is protected by a protecting mechanism as described using FIG. 9. The protecting mechanism is the butting structure comprised of the projecting parts 75 of the push member 15, and the butting wall 77 of the body case 3. Hereinafter, a behavior of the protecting mechanism will be described.

Figure 9:
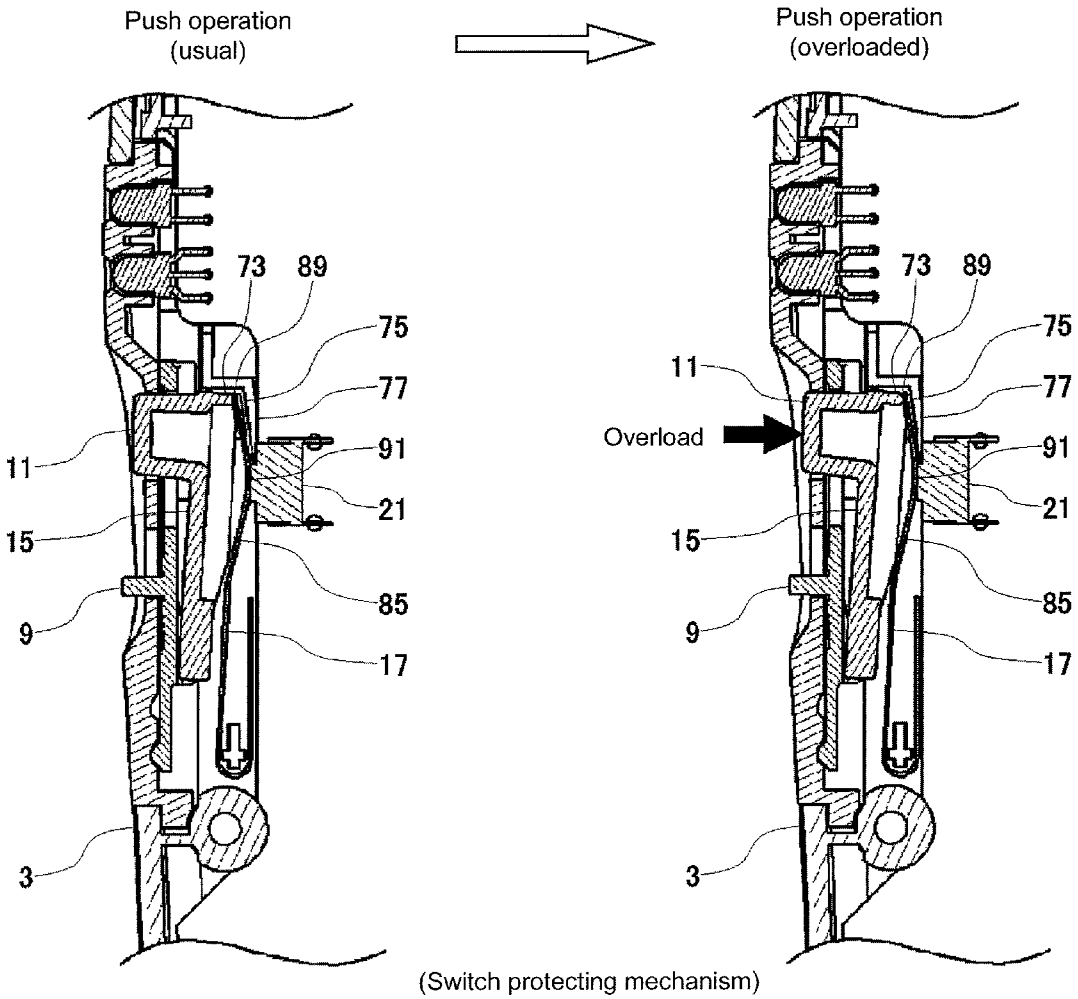
FIG. 9 is a view showing a protective function when a push button is pushed in due to overload.

As shown in FIG. 9, assume that after the push button 11 is pushed and the microphone 1 becomes in the conductive state, the push button 11 is further pushed in, and a pushing load increases. The tip 89 of the spring 17 is pushed by the contact part 73 of the tip of the push member 15, and the movable part 85 of the spring 17 further elastically deforms. Subsequently, when the push-down amount of the push button 11 reaches the predetermined maximum push stroke, the projecting parts 75 of the push member 15 butt against the butting wall 77, which is a part of the partition wall of the body case 3. As a result, even though the pushing load further increases, movement of the push member 15 is prevented by the butting wall 77. Hence, the load on the spring 17 and the switch 21 does not increase any more, and thus damage of the switch 21 and the spring 17 can be prevented.

Figure 13:
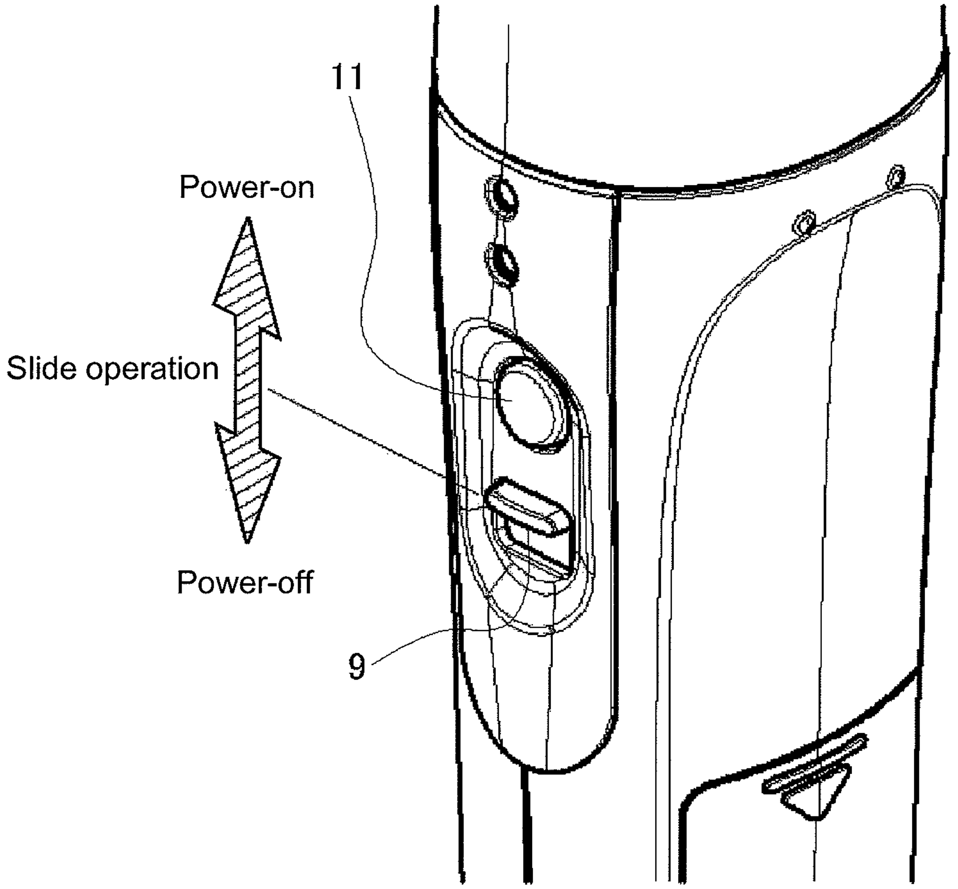
FIG. 13 is a perspective view showing a slide operation method.

Next, the slide operation will be described with reference to FIGS. 5, 7, 11, and 13. FIG. 13 shows the operation method, FIG. 5 shows a state before power-on operation, FIG. 7 shows a state after the power-on operation, and FIG. 11 shows a behavior of the interlocking mechanism comprised of the first inclined surfaces 101 and the second inclined surfaces 103. In the slide operation, the user grasps the microphone 1 and slides the slide knob 9 up and down with his thumb. An upward slide is the power-on operation, and a downward slide is the power-off operation.

First, assume that the microphone 1 is in the nonconductive state. In the nonconductive state, the slide member 13 is, as shown in FIG. 5, located at the lower nonconductive position. Additionally, the elastic claw 61 of the slide member 13 has fitted in the lower claw fitting part 63 of the operation panel 7, and the slide member 13 is locked in the nonconductive position.

When an upward slide operating force is applied to the slide knob 9, the elastic piece part 59 of the slide member 13 elastically deforms and bends, the elastic claw 61 comes away from the claw fitting part 63, and the slide member 13 slides. Subsequently, the first inclined surfaces 101 of the slide member 13 come into contact with the second inclined surfaces 103 of the push member 15, and press these second inclined surfaces 103. A direction of the force is converted by the inclined surfaces, and the push member 15 is subject to the force of the pushing direction.

Although the slide member 13 can slide in the Y direction, it is restrained in the X direction. Meanwhile, the push member 15 can move in the X direction. Hence, when the slide member 13 continues to move in the sliding direction, the first inclined surfaces 101 and the second inclined surfaces 103 slide, the push member 15 moves in the pushing direction according to the movement of the slide member 13, and the spring 17 bends. When the slide member 13 further proceeds, the movable part 85 of the spring 17 comes into contact with the switch 21, the stem 91 of the switch 21 is pushed, the contact becomes conductive, and then the microphone 1 becomes in the conductive state.

As shown in FIG. 11, when the slide member 13 further moves, the first inclined surfaces 101 pass through the second inclined surfaces 103, and the back surface of the slide member 13 comes into contact with the push member 15. Subsequently, when the slide member 13 reaches the conductive position, which is an upper stroke end, the elastic claw 61 of the slide member 13 fits in the upper claw fitting part 65, and the slide member 13 is locked in the conductive state.

In the slide operation, even though the user's finger is moved away from the slide knob 9 after the power is turned on, and the operating force is removed, the slide member 13 is fixed, and the conductive state is maintained. Hence, since it is not necessary to continue to apply the operating force when using the microphone 1 for a long time, the user has less stress.

Next, power-off operation will be described. The power-off operation is the opposite of the above-described power-on operation. The user grasps the microphone 1 and slides the slide knob 9 downwardly with his thumb. When a downward slide operating force is applied to the slide knob 9, the elastic piece part 59 of the slide member 13 elastically deforms and bends, the elastic claw 61 comes away from the upper claw fitting part 65, and the slide member 13 starts to slide downwardly. The first inclined surfaces 101 of the slide member 13 also move downwardly, reach the second inclined surfaces 103, and slide with the second inclined surfaces 103. As a result, since the second inclined surfaces 103 can move toward the outside, the push member 15 is biased by a restoring force of the spring 17 to thereby move outside. When the first inclined surfaces 101 move away from the second inclined surfaces 103, the push member 15 comes into contact with the slide member 13, and completely returns to an original position. The movable part 85 of the spring 17 moves away from the stem 91 of the switch 21, the contact of the switch 21 is opened, and the microphone 1 becomes in the nonconductive state. The slide member 13 reaches the nonconductive position, which is a lower stroke end, the elastic claw 61 of the slide member 13 fits in the lower claw fitting part 63, and the slide member 13 is locked in the nonconductive state.

Next, a modified example of the embodiment will be described. A removable incorrect operation preventing cover is provided in this modified example. Assume that the user selects to use either the slide knob 9 or the push button 11 in the long run. In such a case, the unused operating part is unnecessary for the time being, and it causes incorrect operation. Consequently, in the embodiment, the incorrect operation preventing cover is provided in order to prevent incorrectly touching the unused operating part.

Figure 14:
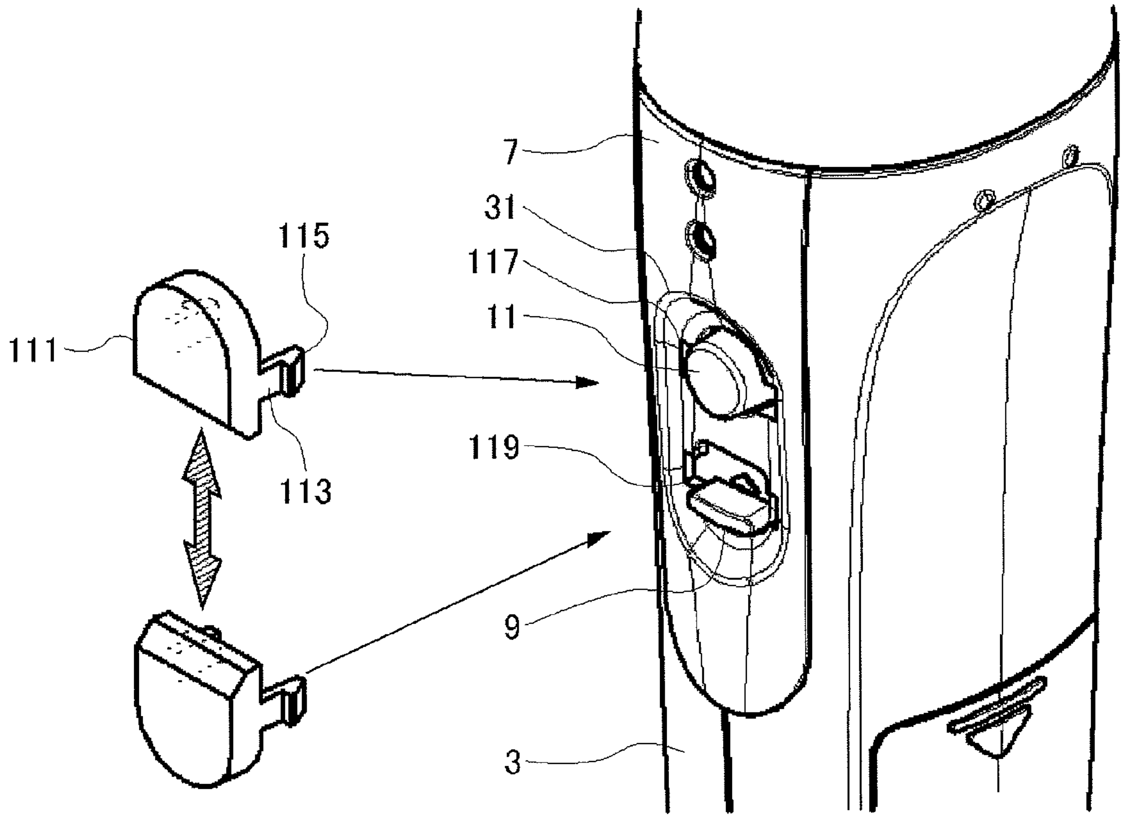
FIG. 14 is a view showing an incorrect operation preventing cover removable with respect to an operation panel.

Referring to FIG. 14, an incorrect operation preventing cover 111 is a shape for covering one of the slide knob 9 and the push button 11. The incorrect operation preventing cover 111 has a semicircular part that matches a semicircle of upper and lower ends of the recess 31 of the operation panel 7. Legs 113 extend from both right and left ends of the incorrect operation preventing cover 111, and the legs 113 have fitting claws 115 at tips thereof.

Meanwhile, the operation panel 7 of the microphone 1 has fitting holes 117 at both right and left sides of the push button 11, and similarly, has fitting holes 119 at both sides of the slide knob 9. The fitting holes 117 are comprised of recesses (notches) formed at an edge of the button opening 37 through which the push button 11 passes. In addition, the fitting holes 119 are comprised of recesses (notches) formed at an edge of the knob opening 39 through which the slide knob 9 passes.

According to such a configuration, the incorrect operation preventing cover 111 is removable with respect to the operation panel 7. Additionally, the incorrect operation preventing cover 111 is attached to the operation panel 7 to cover the push button 11 or the slide knob 9.

Figure 15:
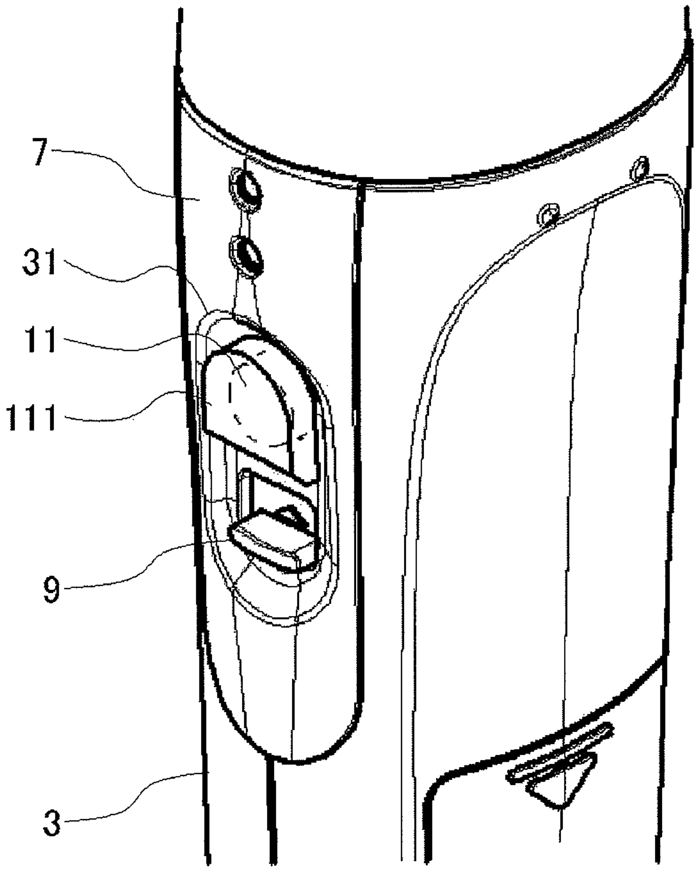
FIG. 15 is a view showing a state where the incorrect operation preventing cover is attached so as to cover the push button.

When the user uses the slide knob 9 in the long run, the incorrect operation preventing cover 111 is arranged so that the semicircular part thereof may be directed upwardly as shown in FIG. 15. Subsequently, the right and left legs 113 are inserted in the right and left fitting holes 117 of the push button 11. As a result, the right and left fitting claws 115 engage with the fitting holes 117, the incorrect operation preventing cover 111 is fixed to the operation panel 7, and covers an exterior of the push button 11. Hence, the user can be prevented from incorrectly touching the push button 11.

Figure 16:
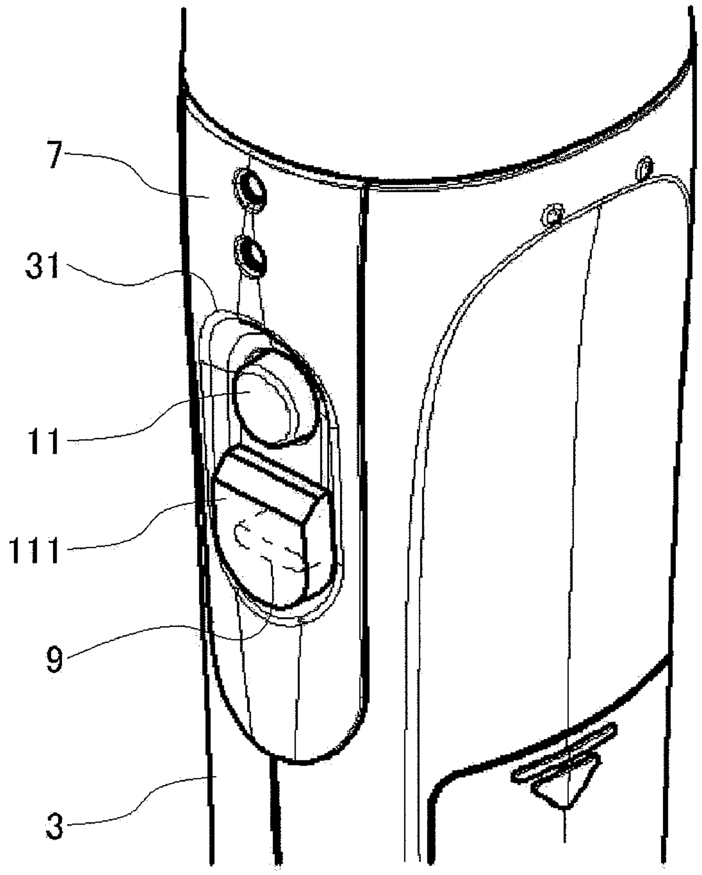
FIG. 16 is a view showing a state where the incorrect operation preventing cover is attached so as to cover a slide knob.

Meanwhile, when the user uses the push button 11 in the long run, the incorrect operation preventing cover 111 is reversed, and is arranged so that the semicircular part thereof may be directed downwardly as shown in FIG. 16. Subsequently, the right and left legs 113 are inserted in the right and left fitting holes 119 of the slide knob 9. As a result, the right and left fitting claws 115 engage with the fitting holes 119, the incorrect operation preventing cover 111 is fixed to the operation panel 7, and covers an exterior of the slide knob 9. Hence, the user can be prevented from incorrectly touching the slide knob 9.

In a manner described above, according to the embodiment, a simple configuration allows for suitably preventing incorrect operation occurring when the user touches the operating part not to be used in the long run.

The microphone according to the embodiment of the present invention has been described above. The switch 21 corresponds to the electrical contact component of the present invention in the above-described embodiment. In addition, the slide member 13 corresponds to the first operating means, and the slide knob 9 corresponds to the first operating portion. In addition, the push member 15 corresponds to the second operating means, and the push button 11 corresponds to the second operating portion. In addition, the first inclined surfaces 101 of the slide member 13 and the second inclined surfaces 103 of the push member 15 correspond to interlocking means (or the interlocking mechanism).

The first operating means (slide member 13) has a configuration on which power-on operation and power-off operation are performed independently, and the conductive state and the nonconductive state are switched according to the operation on the first operating portion (slide knob 9). Namely, after the power-on operation is performed by the first operating means, the conductive state is maintained until the next power-off operation. In addition, after the power-off operation is performed by the first operating means, the nonconductive state is maintained until the next power-on operation. The second operating means (push member 15) holds the electrical contact component in the conductive state only while the power-on operation is performed to the second operating portion (push button 11), and it turns the power off when the force of the power-on operation is removed.

Since such first operating means, second operating means, and interlocking means are provided, the first operating means is used conveniently when using the microphone 1 for a long time according to the embodiment. When power-on and power-off are repeated for a short time, the second operating means is used conveniently. In addition, by using the second operating means, for example, when short-time use of the microphone is performed in turns by a plurality of users, microphone power supply is turned off when the microphone is handed over or dropped, thus enabling to avoid noise output.

In addition, since the operation on the first operating means is transmitted to the electrical contact component (switch 21) through the second operating means by having provided the interlocking means, only one electrical contact component may be needed, and thus the configuration of the microphone device is simple.

Further, since the first operating portion and the second operating portion are separated from each other, it is possible to prevent incorrect operation such as that occurring when the first operating means is operated incorrectly during the operation of the second operating means. Specifically, since the slide knob 9 and the push button 11 are separated from each other, it is possible to prevent incorrect operation such as that occurring when the slide operation is performed incorrectly during the push operation.

In this way, according to the embodiment, the microphone 1 can be provided that is highly convenient when used for a short time, is capable of avoiding noise output when handed over and dropped, is further capable of preventing noise due to incorrect operation, and has a simple configuration.

In addition, according to the embodiment, the interlocking mechanism is comprised of the first inclined surfaces 101 of the slide member 13, and the second inclined surfaces 103 of the push member 15. The first inclined surfaces 101 and the second inclined surfaces 103 are inclined relative to the sliding direction and the pushing direction, and when the slide member 13 slides from the nonconductive position to the conductive position, the first inclined surfaces 101 press the second inclined surfaces 103 to move the push member 15 in the pushing direction. Hence, a simple configuration comprised of the two inclined surfaces 101 and 103 to be engaged with each other enables the push member 15 to interlock with the slide member 13.

In addition, according to the embodiment, the spring 17 is arranged between the switch 21 and the push member 15 to bias the push member 15 in the opposite direction to the pushing direction. The push operation is transmitted to the switch 21 through the spring 17. In addition, when the push button 11 is not pushed, the push member 15 is biased by the spring 17, and thereby the nonconductive state is maintained. In this way, according to a simple configuration in which the spring 17 is interposed between the switch 21 and the push member 15, a function of the push member 15 that temporarily turns the power on can be suitably achieved.

In addition, the push button 11 is located closer to the tip side of the microphone than the slide knob 9 in the embodiment. When the user operates the push button 11 while gripping the microphone 1, his thumb is directed to the tip of the microphone in many cases. Therefore, when the user pushes down the push button 11 with his thumb, the thumb tends to slip toward the tip side of the microphone. Since the push button 11 is arranged closer to the tip side of the microphone than the slide knob 9 in this configuration, the thumb does not come into contact with the slide knob 9 even if the thumb slips. Hence, incorrect operation can be prevented more reliably.

In addition, according to the embodiment, the locking means is provided that locks the slide member 13 in either the conductive position or the nonconductive position. Hence, the slide member 13 can be reliably held at the conductive position or the nonconductive position, and thus the conductive state or the nonconductive state can be reliably maintained.

In addition, in the embodiment, the locking means of the slide member 13 has the elastic claw 61 projecting from the deflectable elastic piece part 59, the elastic claw 61 fits in any of the plurality of claw fitting parts 63 and 65 respectively corresponding to the conductive position and the nonconductive position, and thereby movement of the slide member 13 is limited. Hence, a simple configuration allows for locking the slide member 13 in the conductive position or the nonconductive position.

In addition, in the embodiment, the butting structure is provided so that movement of the push member 15 in the pushing direction may be restrained before the load on the push button 11 exceeds the predetermined upper-limit load. According to this configuration, even when the push button 11 is pushed in with the unusual overload by mischief etc., the protective function can be provided that prevents the switch 21 etc. from being damaged. In addition, such protective function can be achieved without increasing the number of parts.

In addition, in the embodiment, the operation panel 7 has covered the push member 15 and the slide member 13, the operation panel 7 has the button opening 37 for exposing the push button 11, and the knob opening 39 for exposing the slide knob 9, and the button opening 37 and the knob opening 39 are partitioned by the partitioning part 41. According to this configuration, the push button 11 and the slide knob 9 can be appropriately separated from each other, and thus incorrect operation can be prevented reliably.

In addition, in the embodiment, the operation panel 7 has the recess 31 surrounded by the inclined surface 33, and the button opening 37 and the knob opening 39 are provided on the bottom 35 of the recess 31. According to this configuration, the user's finger is guided by the inclined surface 33, incorrect operation can be reduced, and operation of the microphone becomes easy. Preferably, the push button 11 is arranged closer to the tip side of the microphone than the slide knob 9, and near the inclined surface 33. As a result, even though the user's thumb is about to slip from the push button 11, it is supported by the inclined surface 33 of the operation panel 7. Hence, slip can be prevented, and operation of the microphone becomes easy.

In addition, according to the embodiment, the incorrect operation preventing cover 111 is provided so as to selectively cover either the push button 11 or the slide knob 9, the cover being removable with respect to the operation panel 7. According to this configuration, assuming that the user operates either the push button 11 or the slide knob 9 in the long run, touching the other adjacent operating portion incorrectly can be prevented.

The preferred embodiment of the present invention has been described above. However, the present invention is not limited to the above-mentioned embodiment, and it goes without saying that those skilled in the art can modify the above-mentioned embodiment within the scope of the present invention.

The preferred embodiment of the present invention that can be considered at present has been described above, and it is intended to be understood that various modifications can be performed with respect to the embodiment, and to include in the appended claims all the various modifications within the true spirit and the scope of the present invention.

INDUSTRIAL APPLICABILITY

As described above, the microphone device according to the present invention has an effect that it is highly convenient when used for a short time, is capable of avoiding noise output when handed over and dropped, is further capable of preventing noise due to incorrect operation, and has a simple configuration, and it is useful as a microphone device etc. used for education etc.

REFERENCE SIGNS LIST

1 Microphone
3 Body case
7 Operation panel
9 Slide knob
11 Push button
13 Slide member
15 Push member
17 Spring
21 Switch
31 Recess
33 Inclined surface
35 Bottom
37 Button opening
39 Knob opening
41 Partitioning part
59 Elastic piece part
61 Elastic claw
63, 65 Claw fitting part
75 Projecting part
77 Butting wall
101 First inclined surface
103 Second inclined surface
111 Incorrect operation preventing cover

The invention claimed is:

1. A microphone device comprising:

an electrical contact component that switches between a conductive state and a nonconductive state of a microphone power supply;

a first operator having a first operating portion on which a power-on operation, in a first operating direction, and a power-off operation, in a direction opposite to the first operating direction, are independently performed by a microphone user;

a second operator that has a second operating portion by which the power-on operation, in a second operating direction different from the first operating direction, is performed, and that maintains the electrical contact component in the conductive state while the power-on operation is performed in the second operating direction; and an interlock that interlocks the operation of the first operator with the second operator by converting movement of the first operator in the first operating direction into movement of the second operator in the second operating direction, and by converting movement in the direction opposite to the first operating direction of the first operator into movement in a direction opposite to the second operating direction of the second operator, wherein the first operating portion of the first operator and the second operating portion of the second operator are separated from each other, the first operator includes a slider having a slide knob as the first operating portion that can slide between a conductive position and a nonconductive position, the first operating direction is a sliding direction of the slide knob, the second operator includes a pusher having push button as the second operating portion, the second operating direction is a pushing direction of the push button, and the push button is separated from the slide knob, and the interlock has a first inclined surface provided on the slider, and a second inclined surface provided on the pusher, the first inclined surface and the second inclined surface are inclined relative to the sliding direction and the pushing direction, and when the slider slides from the nonconductive position to the conductive position, the first inclined surface presses the second inclined surface to thereby move the pusher in the pushing direction, and the second inclined surface is positioned at both sides of the pusher in a direction transverse to the sliding direction.

2. The microphone device according to claim 1, comprising a spring member arranged between the electrical contact component and the pusher, wherein the spring member biases the pusher in a direction opposite to the pushing direction.

3. The microphone device according to claim 1, wherein the push button is arranged closer to a tip side of the microphone than the slide knob.

4. The microphone device according to claim 1, further comprising a locker that locks the slider in either the conductive position or the nonconductive position.

5. The microphone device according to claim 4, wherein the locker has an elastic claw on the slider and that projects from an elastically deflectable elastic portion of the slider, and the elastic claw fits in any of a plurality of claw fittings respectively corresponding to the conductive position and the nonconductive position to thereby limit movement of the slider.

6. The microphone device according to claim 1, further comprising an abutment that restrains movement of the pusher in the pushing direction before a load on the push button exceeds a predetermined upper-limit load.

7. The microphone device according to claim 1, further comprising an operation panel that covers the pusher and the slider, wherein the operation panel has a button opening for exposing the push button, and a knob opening for exposing the slide knob, and the button opening and the knob opening are partitioned by a partition.

8. The microphone device according to claim 7, wherein the operation panel has a recess surrounded by an inclined surface, and the button opening and the knob opening are provided at a bottom of the recess.

9. The microphone device according to claim 7, including an incorrect operation preventing cover that is removable with respect to the operation panel, and that selectively covers either the push button or the slide knob.

10. A microphone device comprising:

an electrical contact component that switches between a conductive state and a nonconductive state of a microphone power supply;

a first operator having a first operating portion on which a power-on operation, in a first operating direction, and a power-off operation, in a direction opposite to the first operating direction, are independently performed;

a second operator that has a second operating portion by which the power-on operation, in a second operating direction different from the first operating direction, is performed, and that maintains the electrical contact component in the conductive state while the power-on operation is performed in the second operating direction; and an interlock that interlocks operation of the first operator with the second operator by converting movement of the first operator in the first operating direction into movement of the second operator in the second operating direction, and by converting movement in the direction opposite to the first operating direction of the first operator into movement in a direction opposite to the second operating direction of the second operator, wherein the first operator has a base and a leg extending transversely from the base at each longitudinal edge of the base, and the second operator is nested within the legs of the first operator, the second operating portion of the second operator extending through an aperture in the base of the first operator.

11. The microphone device according to claim 10, the aperture being elongated in the first operating direction, whereby the second operating portion projects through the aperture in a power on operation position and in a power off operation position of the first operating portion.

12. The microphone device according to claim 10, the second operating portion of the second operator projecting from a first surface of the second operator, and further comprising a spring member contacting a surface of the said second operator opposite the first surface, the spring member contacting and closing a switch of said microphone device to perform the power on operation.

13. The microphone device according to claim 10, further comprising a locker that locks the first operating portion in either a power on operation position or in a power off operation position.

14. The microphone device according to claim 13, the locker comprising an elastic claw provided on the first operating portion, the elastic claw being configured to fit into any one of a plurality of claw receiving recesses.

15. The microphone device according to claim 14, further comprising an operation panel having a first aperture through which the first operating portion projects and a second aperture through which the second operating portion projects, the plurality of claw receiving recesses provided in the operation panel.

16. The microphone device according to claim 15, the operation panel including a partition that separates the first aperture from the second aperture.

17. The microphone device according to claim 16, wherein the operation panel comprises a recess surrounded by an inclined surface, and the first and second apertures are provided at a bottom of the recess.

18. The microphone device according to claim 10, the interlock comprising an inclined surface of the first operator and an inclined surface of the second operator, each of the inclined surfaces being inclined at substantially a same angle.

19. The microphone device according to claim 18, engagement of the inclined surfaces in response to movement of the first operator in the first operating direction resulting in movement of a spring to close a single contact of a switch of the microphone device.

20. The microphone device according to claim 19, the single spring being distinct from the inclined surfaces.

* * * * *